United States Patent
Frey et al.

(10) Patent No.: US 6,940,846 B1
(45) Date of Patent: Sep. 6, 2005

(54) METHOD AND APPARATUS FOR IMPLEMENTING FEATURE ASSIST ON A TELECOMMUNICATION NETWORK

(75) Inventors: Alan Eugene Frey, Naperville, IL (US); Lyle Dean Kipp, Naperville, IL (US); Om Prakash Mahajan, Ocean, NJ (US); Gerard P. O'Reilly, Manalapan, NJ (US); David D. Moshenberg, Fair Haven, NJ (US); Katherine Ann Zine, Montgomery, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/461,876

(22) Filed: Dec. 15, 1999

(51) Int. Cl.[7] .............................................. H04L 12/66

(52) U.S. Cl. ...................... 370/352; 370/354; 370/401; 370/466

(58) Field of Search ................................ 370/352–356, 370/395.1, 401, 389, 392, 466, 467, 437

(56) References Cited

U.S. PATENT DOCUMENTS

| | | | | |
|---|---|---|---|---|
| 5,956,396 A | * | 9/1999 | Ash et al. | 379/220.01 |
| 5,995,606 A | * | 11/1999 | Civanlar et al. | 379/207.13 |
| 6,141,342 A | * | 10/2000 | Cheesman et al. | 370/352 |
| 6,195,714 B1 | * | 2/2001 | Li et al. | 710/31 |
| 6,304,565 B1 | * | 10/2001 | Ramamurthy | 370/352 |
| 6,304,566 B1 | * | 10/2001 | Schessel | 370/354 |
| 6,327,358 B1 | * | 12/2001 | March et al. | 379/221.01 |
| 6,411,704 B1 | * | 6/2002 | Pelletier et al. | 379/230 |

* cited by examiner

Primary Examiner—Ricky Ngo
Assistant Examiner—Soon D. Hyun

(57) ABSTRACT

A system for the handling of calls by a packet-based telephony system by which calls invoking features not implemented on the packet-based system are handed off to an existing legacy circuit-switched telephony system for further processing. Initial address messages are forwarded to a packet network feature server, which determines whether the features invoked by the call can be provided. If not, the feature server assigns the call a trunk selection parameter according to the type of feature invoked. The trunk selection parameter is conveyed to a connection gateway, which routes the call on one of a plurality of voice trunks. The call is received by a circuit-switched switching system for further processing according to the feature invoked.

5 Claims, 1 Drawing Sheet

METHOD AND APPARATUS FOR IMPLEMENTING FEATURE ASSIST ON A TELECOMMUNICATION NETWORK

BACKGROUND OF THE INVENTION

1. Field of the Invention

This invention relates in general to telecommunications systems. In particular, the invention relates to a packet switched telephony network that can interface with the long established circuit switched telephony network.

2. Background Art

In recent years, voice, video, and data communication networks have rapidly converged, resulting in vast increases in the power and flexibility of modern communications. In effectuating the next step of this convergence and development, it becomes highly desirable to transmit voice communications over the same types of efficient, packet-switched networks currently used for data transmission. By routing multiple types of communications over a common network, providers of multiple communications services can exploit the efficiencies of packet communications, and potentially avoid the added expense of developing and/or maintaining multiple networks.

However, while converting to a packet-switched network for voice communications would offer many advantages to communication service providers and consumers alike, there already exists a vast and complex pre-existing communications infrastructure based upon circuit-switched telephony protocols. Thousands of telephony features have been implemented within the legacy circuit-switched networks, which require great effort and time to be designed into a new packet network. Moreover, the existing circuit-switched and newer packet switched networks are not directly compatible due to substantial differences in the format and transmission protocols between circuit-switched networks and packet-switched networks. The sheer magnitude and complexity of circuit-switched telephony systems already in place make it unfeasible to both develop and install a packet-switched network that completely and immediately replaces the legacy of circuit-switched networks.

As a result, it is an object of this invention to provide a packet-switched network for the conduction of telephonic communications, which interfaces with the legacy circuit-switched network when necessary. While it is understood that the packet-based telephony system can readily interface with the circuit switched system in a variety of network positions using the techniques described herein, this invention specifically discloses an embodiment for routing call traffic between Local Exchange Carrier ("LEC") access tandems over a packet-based network. It is also an object of this invention to allow the packet-switched network to seamlessly hand off calls to an existing circuit-switched network when the calls require telephony features that are not yet implemented in the packet-switched network.

While telecommunication service providers can stagger the introduction of advanced features into a packet-switched network by handing off calls invoking unsupported features to the legacy network, such an approach would be very costly and time consuming to implement if it required the addition or modification of signaling inputs to the many existing legacy switching systems in order to effectuate such inter-system routing. Therefore, a further object of this invention is to provide a packet-switched network which can interface with the circuit-switched network without requiring new signaling inputs, or any other changes to the legacy circuit-switched network infrastructure.

These and other objects of the present invention will become apparent to those of ordinary skill in the art in light of the present specifications, drawings and claims.

SUMMARY OF THE INVENTION

The invention allows a packet-based telephony network to hand off a call to a circuit-switched telephony network when the call invokes features that are not supported by the packet-based network, but are implemented by the circuit-switched network. The bearer channel for the call is initially transmitted from an access tandem or end office to a media gateway, such as a packet voice gateway, where the call is transmitted onto a packet-based network, such as an IP-based connection or an ATM transport. Meanwhile, an initial address message associated with the call is received by a call processing entity such as a connection gateway, which forwards the message to a feature server call processing entity within the packet network. The feature server determines from the initial address message the type of feature invoked by the call.

If the call invokes a feature that is not supported by the feature server, the feature server conveys a routing message to a terminating connection gateway, indicating that the call should be routed to a legacy circuit-switched switching system for processing. The routing message may include a trunk selection parameter, whereby the feature server specifies one of a plurality of voice trunks in a shared trunk group upon which the call should be routed to the legacy switch. Because the calls routed to the circuit-switched switching system are partitioned based upon the type of feature invoked, the switching system requires no further input or interaction with the packet-based network media gateway—the calls are received as if they were coming directly from the access tandem. Finally, the invoked feature is provided by the circuit-switched telephony network. The call may then be either routed to its destination via the circuit-switched network, or sent back onto the packet-based network for routing to its destination.

DETAILED DESCRIPTION OF THE DRAWINGS

Figure 1:
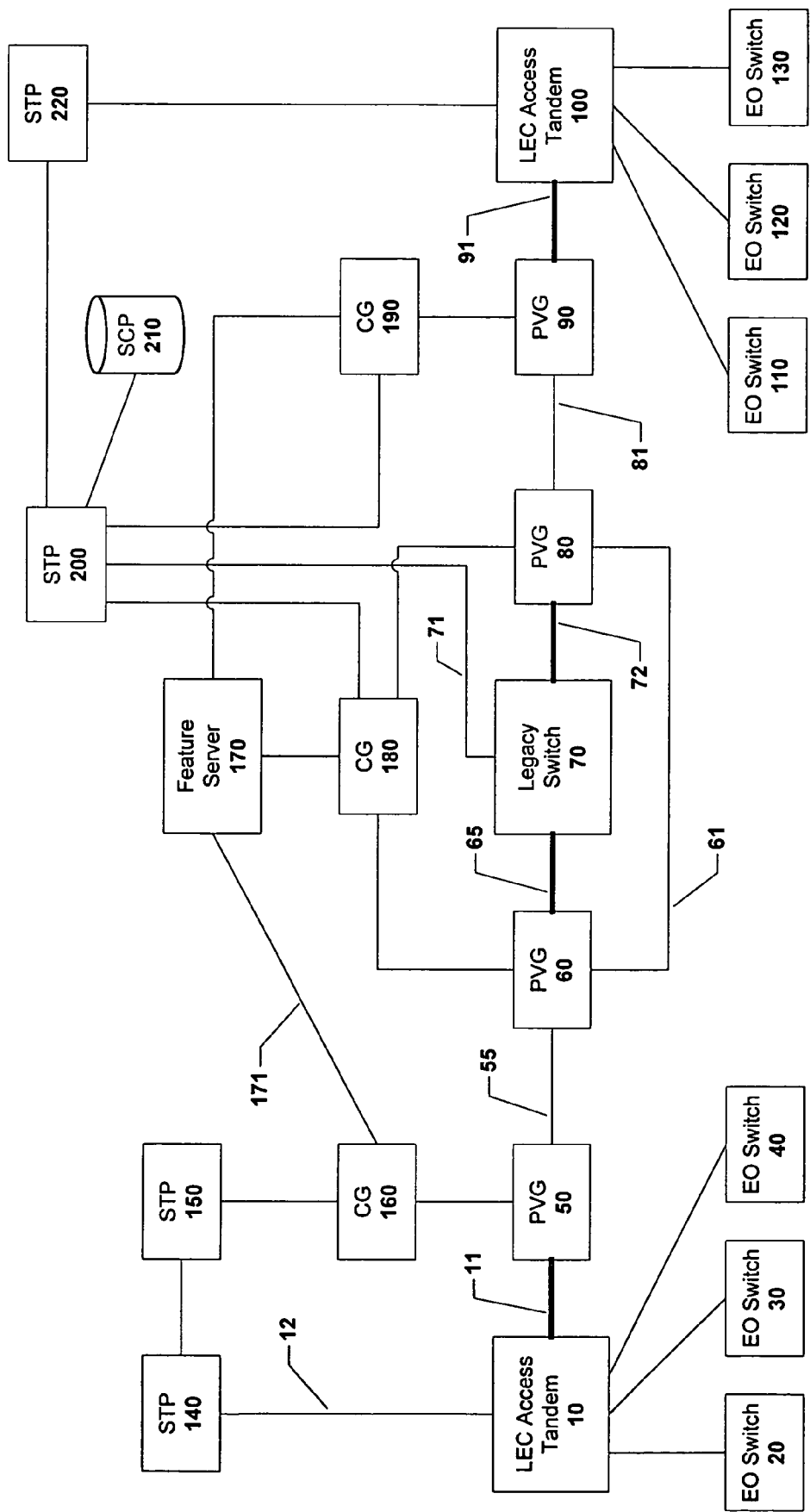
FIG. 1 is a block diagram of a telephony network in which calls can be routed between packet-based and circuit-switched networks.

While this invention is susceptible to embodiment in many different forms, there are shown in the drawings and will be described in detail herein specific embodiments. The present disclosure is to be considered as an exemplification of the principle of the invention intended merely to explain and illustrate the invention, and is not intended to limit the invention in any way to embodiments illustrated.

The embodiment of FIG. 1 depicts a system by which calls can be routed between packet-switched and circuit-switched telephony networks as appropriate to provide call features, without modification to or disruption of the existing circuit-switched network infrastructure. In such manner, the packet-switched network can be utilized without sacrificing network functionality even when the packet network itself does not yet support all of the network call and functional features supported by the legacy circuit-switched network.

LEC access tandems receive calls from end office telephone switches in one local region and transfer such calls to a network in a different region. Local regional networks may be managed and maintained by different service providers. By utilizing access tandems to route calls out of a local geographic region, end office switches are each relieved of the need to store routing information for the multitude of alternate service provider switches. As previously discussed, it is desirable to utilize packet-based communication networks to route voice calls between tandems. Accordingly, in the embodiment of FIG. 1, LEC Access Tandem 10 can route calls originating in any of end office switches 20, 30, and 40 to LEC Access Tandem 100, and the separate local geographic region serviced by end office switches 110, 120, and 130.

In particular, LEC Access Tandem 10 receives calls from end office switches 20, 30, and 40, which calls may be directed to the local region serviced by end office switches 110, 120, and 130. The calls are routed from the local end office switches to Access Tandem 10. They are then routed onto voice trunk 11, which may be, for example, a Feature Group D ("FGD") trunk, according to conventional circuit-switched protocol. Additionally, Access Tandem 10 conveys a Common Channel Signaling ("CCS") Signaling System 7 ("SS7") Initial Address Message ("IAM") onto line 12 to an SS7 network that includes Signal Transfer Points ("STPs") 140 and 150, indicating the type of call being routed onto FGD trunk 11, according to standard SS7 protocol.

The bearer channels for calls on FGD trunk 11 are received by Packet Voice Gateway ("PVG") 50. PVG 50 is a media gateway that serves as an interface between circuit-switched (time domain multiplexed) trunk 11 and packet-switched network 55, for converting the bearer channel data between the protocols. In the embodiment of FIG. 1, packet-switched network 55 is comprised of Asynchronous Transfer Mode ("ATM") transports. However, packet-switched network 55 may be comprised of alternative packet-based networks, such as one based on the Internet Protocol ("IP"), as is known in the art. A call received on FGD trunk 11 is converted to packet data and routed onto packet network 55. Meanwhile, its corresponding SS7 IAM message is conveyed to the network of STPs 140 and 150 by Access Tandem 10, and received at Connection Gateway 160. Connection Gateway 160 forwards the incoming IAM message to Feature Server 170 via signaling connection 171.

Feature Server 170 manages calls throughout the packet network, administering all features implemented by the packet network. Such features may include network management services, call control, customer services such as call waiting, Centrex-type functionality, and customized services developed for a particular provider. Feature Server 170 inspects the incoming IAM message to determine the type of call being routed, and accordingly, the type of feature(s) required to properly route and/or handle the call.

If Feature Server 170 determines from the IAM message that it can provide the features necessary to route a call, the call is routed through the extent of the packet network. In the embodiment of FIG. 1, Feature Server 170 signals one or more packet network connection gateways, which in turn control associated PVGs, to direct the call through the packet network. For example, the call is routed from PVG 50 through ATM network 55 to PVG 90. PVG 90 then interworks the bearer channel onto circuit-switched trunk 91, to LEC Access Tandem 100, from which the call is distributed to the appropriate destination end office switch, 110, 120 or 130.

However, in some circumstances, particularly in early deployments of packet-based networks, calls routed into the packet-based network will require features that are not implemented on Feature Server 170, such as Advanced Intelligent Network ("AIN") services including a Virtual Private Network ("VPN") connection. Such calls are handled by the network of the present invention by a Feature Assist provision, whereby the legacy circuit-switched network is accessed to provide features that the packet network cannot.

If Feature Server 170 determines, through its evaluation of the SS7 IAM message received from Connection Gateway 160, that a call requires a feature which it cannot provide, Feature Server 170 signals Connection Gateway 180 indicating that the call should be handed off to the legacy circuit-switched network. The call is routed from packet network 55 to PVG 60, and Connection Gateway 180 sets up a circuit switched call from PVG 60 to legacy circuit switch 70 on shared trunk group 65. The circuit switched call is received by legacy switch 70 on shared trunk group 65 as if it were received directly from an LEC Access Tandem.

Legacy switch 70 then routes the call either into the legacy circuit-switched network for delivery to its destination therefrom, or back onto the packet-based network for further routing thereon, depending upon the particular call destination and feature being provided. If a call is directed to a destination that is serviced by the packet-based network, legacy switch 70 may perform the feature assist and then route the call back into the packet-based network. For example, in the embodiment of FIG. 1, legacy switch 70 may perform a required feature assist by interacting with a database administered at Service Control Point ("SCP") 210. The interaction is accomplished by SS7 signaling known in the art, through the SS7 network that includes STPs 200 and 220. Legacy switch 70 could then route the call back into the packet-based network on TDM trunk 72, to PVG 80. The IAM is sent to Connection Gateway 180 which, together with Feature Server 170 and Connection Gateway 190, would proceed to route the call through ATM network 55 to PVG 90, for delivery to its ultimate destination by LEC Access Tandem 100 and its associated local network via TDM trunk 91.

In other circumstances, a call may be routed to legacy switch 70 when its destination cannot be further serviced by the packet-switched network, or when a particular feature assist requires that the call be routed thereafter over the legacy network. Legacy switch 70 can then route the call into the legacy circuit-switched network (not shown) of which it is a part, for subsequent completion to its destination, as is known in the art.

An important aspect of the invention reduces the processing required by legacy switch 70, and allows for the seamless interaction between the packet-based network and the legacy circuit-switched network—without developing additional signaling inputs, or otherwise requiring changes, to legacy switch 70. In particular, Connection Gateway 180 routes packet calls received by PVG 60 on ATM transport 55 that require feature assist onto a specified one of a plurality of TDM trunks in shared trunk group 65, depending upon the type of feature invoked by each call. Each trunk is received by legacy switch 70 as a particular type, for which specific features are provided. By allocating calls within a group of trunks based upon features requested, legacy switch 70 receives an indication of the type of feature assist required for each call, thereby reducing the call processing required. Moreover, without this type of partitioning, additional signaling operations would have to be carried out between the packet-based telephony system and the legacy circuit-switched telephony system to indicate appropriate treatment for each call.

However, in typical telephony systems today, the selection of a trunk group and the parameters associated with that trunk are independent operations. Accordingly, the association of a trunk group with particular features is hidden and indirect. Therefore, the present invention contemplates the use of a Trunk Selection Parameter ("TSP"), which can be used to identify the appropriate shared trunk group to which a call should be assigned depending upon the feature assist invoked by the call.

In the embodiment of FIG. 1, when Feature Server 170 detects that a call requires a feature that it cannot provide, it determines a TSP associated with the required feature. The TSP is then sent out to Connection Gateway 180. Connection Gateway 180 routes the call to a particular trunk of shared trunk group 65 based upon the call's assigned TSP. Connection Gateway 180 thereby routes the call to legacy switch 70 via the appropriate trunk group on shared trunk group 65, such that legacy switch 70 can automatically handle the call properly. Accordingly, the trunk assignment by Feature Server 170 both eliminates the need for expensive modification of the legacy circuit-switched telephony network, and also reduces the administration overhead incumbent upon legacy switch 70 in appropriately handling the calls it receives from the packet-based network.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

We claim:

1. A telephony system in which a call can be handed off from a packet-based network to a circuit-switched network when the call invokes a feature that is supported by the circuit-switched network but is not implemented on the packet-based network, the system comprising:

a circuit switched network switch that routes the call onto a first voice trunk and transmits an initial address message associated with the call;

a first packet voice gateway, which sets up a connection between the first voice trunk and the packet-based network;

a first connection gateway that receives the initial address message;

a feature server that receives the initial address message forwarded from the first connection gateway, and conveys a routing message to a second connection gateway if the invoked feature cannot be provided by the feature server;

the second connection gateway that selects a second trunk onto which the call is routed, which second trunk is in a shared trunk group connected to a second circuit switched network switch;

a second packet voice gateway that sets up a connection between the packet based network and the second trunk;

the second circuit-switched network switch that is connected to the circuit-switched network, which second circuit-switched network switch receives the call via the second trunk and provides the feature invoked by the call; and the routing message from the feature server to the second connection gateway including a trunk selection parameter, which parameter is determined by the type of feature invoked by the call, and where the second connection gateway selects the second trunk based upon the trunk selection parameter.

2. The apparatus of claim 1, in which the second circuit-switched network switch provides at least one feature to the call, which feature is determined by the particular second trunk in the shared trunk group on which the call is received.

3. A method for handing off a call from a packet-based telephony system to a circuit-switched telephony system for call processing, the method comprising the steps of:

forwarding to a packet network feature server signaling associated with the initiation of the call;

determining that the call invokes a feature that cannot be provided by the packet-based network;

routing the call from the packet-based network to a circuit-switched switch within a circuit-switched network by assigning a trunk selection parameter corresponding to the feature invoked by the call; and routing the call onto one of a plurality of trunks in a shared trunk group, which trunk is chosen based upon the assigned trunk selection parameter; and processing the call on the circuit-switched network.

4. A telephony system in which a call can be handed off from a packet-based network to a circuit-switched network when the call invokes a feature that is supported by the circuit-switched network but is not implemented on the packet-based network, the system comprising:

a packet-based network operatively connected to a circuit-switched network, the circuit-switched network supporting a call feature that is not implemented on the packet-based network;

a circuit switched network switch that routes the call onto a first voice trunk and transmits an initial address message associated with the call;

a first packet voice gateway, which sets up a connection between the first voice trunk and the packet-based network;

a first connection gateway that receives the initial address message;

a feature server that receives the initial address message forwarded from the first connection gateway, and conveys a routing message to a second connection gateway if the invoked feature cannot be provided by the feature server;

a second connection gateway that selects a second trunk onto which the call is routed, which second trunk is in a shared trunk group connected to a second circuit switched network switch, a second trunk being selected from the shared trunk group as a function of the invoked feature;

a second packet voice gateway that sets up a connection between the packet based network and the second trunk;

a second circuit-switched network switch that is connected to the circuit-switched network, which second circuit-switched switch receives the call via the second trunk and provides the feature invoked by the call; and the routing message from the feature server to the second connection gateway including a trunk selection parameter, which parameter is determined by the type of feature invoked by the call, and where the second connection gateway selects the second trunk based upon the trunk selection parameter.

5. The system according to claim 4, in which the second circuit-switched network switch provides at least one feature to the call, which feature is determined by the particular second trunk in the shared trunk group on which the call is received.

* * * * *